Figure 1:
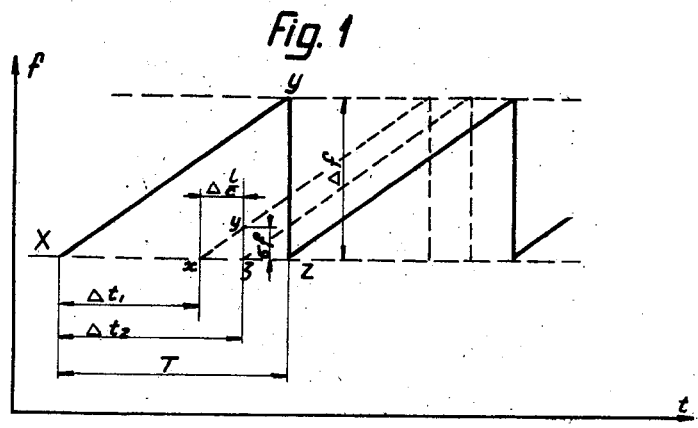

Dec. 30, 1952   J. BOUZITAT ET AL   2,624,045
METHOD AND SYSTEM OF RADIO NAVIGATION
Filed Sept. 24, 1948   3 Sheets-Sheet 1

Inventors
Jean Bouzitat and
Pierre Perilhon
by Brown & Seward
Attorneys

Dec. 30, 1952  J. BOUZITAT ET AL  2,624,045
METHOD AND SYSTEM OF RADIO NAVIGATION
Filed Sept. 24, 1948  3 Sheets-Sheet 2

Inventors
Jean Bouzitat and
Pierre Perilhon
by Brown & Deward
Attorneys

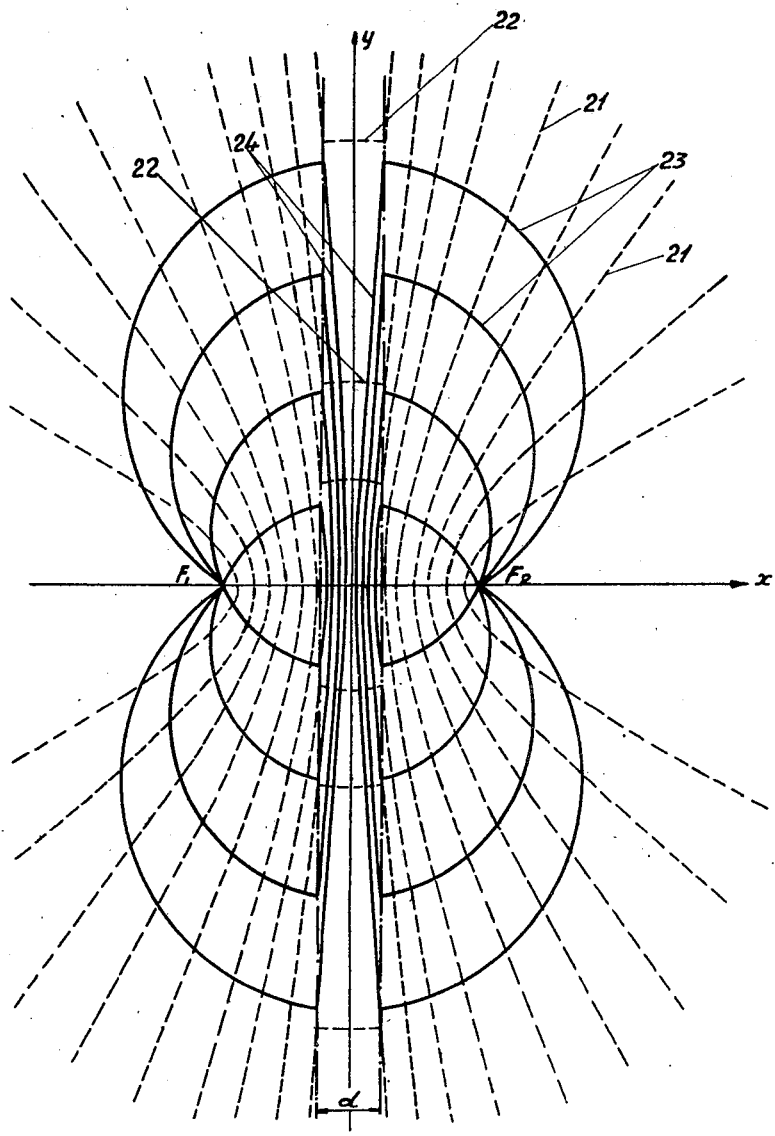

Patented Dec. 30, 1952

2,624,045

UNITED STATES PATENT OFFICE 2,624,045

METHOD AND SYSTEM OF RADIO NAVIGATION

Jean Bouzitat, Paris, and Pierre Perilhou, Clamart, France, assignors to Office National d'Etudes et de Recherches Aeronautiques, Paris, France, a company of France Application September 24, 1948, Serial No. 51,028
In France September 25, 1947

27 Claims. (Cl. 343—104)

The present invention relates to the problem of radio navigation or guidance of dirigible crafts and more particularly air or water crafts.

The invention has for its general object to provide an improved method and system of radio navigation of the type similar to that of already known systems of radio navigation called hyperbolic navigation systems and permitting to a craft to know at every instant its position with respect to a given point, by determining curves of equi-signal characteristic of electromagnetic radiations and to be guided towards said point by following one of such curves of equi-signal characteristic.

The method and system of radio navigation according to the invention are characterized more particularly by the fact that they comprise the use on one hand of a single transmission base generally provided at a fixed point and on the other hand, of a single receiving base generally provided on a craft, which differentiates this method and system from the known systems of hyperbolic navigation comprising as a general rule at least two transmission base lines on the ground and a single receiving device on the craft.

The system according to this invention is further characterized in that it permits to define in space a direction or a channel of a privileged guidance for a craft and two sets of curves of equi-signal characteristics of electro-magnetic radiations whereby a craft located outside of said channel or direction of guidance may orient itself with respect to said direction and be guided towards the same while knowing at every instant, its distance and its position with respect to a predetermined point located on said direction.

The system according to the invention is further characterized by the fact that a craft once having reached said privileged direction of guidance may be guided following this direction with a high precison and know at every moment its distance to the predeterminate point on said direction defined by the intersection of said direction with the transmission base line of the system.

The above feature of the invention makes this system applicable with maximum advantages to a blind landing of aircrafts, which form one of the important objects of this invention.

According to a feature of the invention the direction of landing is defined in this particular application by said privileged direction of guidance of the system, so that an aircraft desiring to land may orient itself with respect to said direction by using the curves of equi-signal characteristics and determine at every instant its position with respect to said direction and a desired point of landing on said direction, in order to reach said direction and effect then a landing along said direction.

This feature of the system according to the invention may be equally of interest for the problem of guiding vessels at the entrance of harbours in conditions of bad visibility. The entrance of a harbour may be found on a vessel by knowing at every instant, its position, its orientation and its distance with respect to said point, as well as with respect to a privileged direction of guidance, defining the axis of said entrance to a harbour and once the vessel has reached thus the entrance of a harbour, it can enter the same by following said privileged direction of guidance.

The method according to the invention consists in transmitting from a given transmission base line electro-magnetic radiations defining in space curves of equi-signal characteristics of said radiations and in receiving said radiations on a reception base line provided on a dirigible craft, so as to detect on the craft said curves, the system as a whole being established so as to define in space and permit a detection on the craft of curves of different signal characteristics the intersections of which define various points of the space around the transmission base line of said radiations.

According to another feature of the invention, the transmission and the reception of guiding radiations are effected so as to define in space and permit a detection on the craft of two families or sets of curves of different natures, permitting respectively to guide a craft toward a point of origin constituted by the mid point of the transmission base line of said radiations and to determine at every instant its position with respect to said point, the intersection of any pair of said curves of different natures, at the point of location of the craft at a given moment, defining the position thereof with respect to said point of origin.

According to a further feature of the invention said transmission and reception of electro-magnetic radiations permit to define a priviliged direction of guidance toward which a dirigible craft may be guided by knowing at every instant its position relative to said direction as well as with respect to a point on said direction, the craft once having attained said direction being guided following the same by knowing at every instant its lateral deviation from said direction and its distance to the mid point of the transmission base line of the system.

The method and system according to this invention are further characterized by the fact that guiding radiations are produced by two transmitting aerials emitting synchroneously related electro-magnetic radiations presenting in relation to time a variable characteristic and defining in space curves or lines of points which are characterized by constant differences of distances to said two transmitting aerials and which constitute therefore a family of curves which takes the form of a set of confocal hyperboles with the points of location of said two transmitting aerials as foci and that the indications for guidance of a craft are derived from measures of a sum of and the difference between the difference of variations in said variable characteristic of said radiations as the same are received by two spaced and independent aerials carried by a craft.

According to a further feature of the invention, this manner of using radiations presenting a variable characteristic and produced by two transmitters permits to define, around the transmission base line formed by said transmitters, two regions, one of which extends following the perpendicular bisector of said transmission base line and has a width corresponding to the spacing of the two receiving aerials, and the other of which is located outside of said first region, said outside region being characterized by hyperbolic curves defined by constant sums of differences between variations of said variable characteristic of said radiations as the same are received by the two receiving aerials, on one hand, and by arcs of circle defined by constant differences of differences between variations of said variable characteristic of said radiations as received by said two receiving aerials on the other hand, whilst the internal region is characterized by arcs of circles defined by constant sums of differences between variations of said variable characteristic of said radiations produced by the two transmitters and received by the two receiving aerials on one hand and by constant arcs of hyperbolae defined by constant differences of differences between variations of said variable characteristic of said radiations as the same are received by said receiving aerials.

According to a still further feature of the invention, the measure of a sum of difference between variations of the variable characteristics of radiations transmitted by two transmitting aerials upon their reception by two receiving aerials in the privileged region of guidance, and of a difference between the differences in variations of the variable characteristics of radiations received by two receiving aerials in the region outside of said first region, serve for the purpose of indicating the distance of the craft to the point of origin constituted by the mid point of the case line connecting the two transmitting aerials, whilst the measure of a difference of differences between the variations occurred in the radiations upon their reception on two receiving aerials in said central or privileged region of guidance along the perpendicular bisector of the transmission base line serves for guiding of the craft following said direction.

Besides, the measure of a sum of differences between variations of the variable characteristic of transmitted radiations as they are received by two aerials outside of the above mentioned central and rectilineal region of guidance, serves for the guidance of the craft toward the transmission base following hyperbolic curves defined by constant values of said sums of differences between the variations of the variable characteristic of said radiations.

According to a still further feature of the invention, the specified method is preferably reduced to practice by using two frequency-modulated transmitters and more particularly according to a saw-teeth law, these transmitters being synchronized and defining in space a family of hyperbolic curves or line of points which are characterized by pre-determined constant differences of distances to the two transmitters, which characteristics appear as differences in frequences giving rise after detection to beat-frequencies corresponding to said differences in received frequencies, and by measuring on a craft sums of and differences between beat-frequencies received by each of the two receiving aerials.

According to a still further feature of the invention, a craft located outside of the central rectilineal channel of guidance may appreciate its distance to the mid point of the transmission base line by the measure of a difference between beat-frequencies received by the two aerials forming a base of reception on the craft, the curves of equal differences between beat-frequencies received at each point by the two aerials being constituted, outside of said central channel of guidance, by arcs of circles passing through the two transmitting aerials.

On the contrary, the measure of a sum of beat-frequencies received by two receiving aerials, again outside of the central region of guidance, permits to guide the craft toward the transmission base or the central axis of guidance, by following one of the curves of equal sum of beat-frequencies mentioned above and constituted by hyperbolic curves admitting for their foci the points of location of the two transmitting aerials or by manoeuvring the craft so as to maintain the sum of beat-frequencies received by the two aerials at a minimum value, taking into account the sense of the difference of beat-frequencies, the antenna receiving a lower frequency being that on the side corresponding to the central channel of guiding.

Finally, a simultaneous measure of a sum and of a difference of beat-frequencies of two receiving aerials carried by a craft permits to determine the position of the latter defined by the intersection of two curves, i. e. of a hyperbola and an arc of circle.

According to a still further feature of the invention, once the craft has reached the central direction of guiding, a very accurate guiding of the craft along said direction may be obtained by measuring the difference of beat-frequencies produced by the two receiving aerials carried by the craft and by manoeuvring so as to render said difference as small as possible.

Finally, the craft being on the direction of guiding defined by the central channel of the system, it is possible to know at each instant its distance to the transmission base line measuring the sum of beat-frequencies received by the two antennae.

The above and other objects and features of the invention will appear more clearly from the following detailed description giving a mathematical theory of its operation and details of its application to an automatic or blind landing system of aircrafts when read with reference to the accompanying drawings, it being understood that the invention is not limited to any particular embodiment described or illustrated and that the reference should be made to the accompanying claims for defining the scope of said invention.

Figure 2:
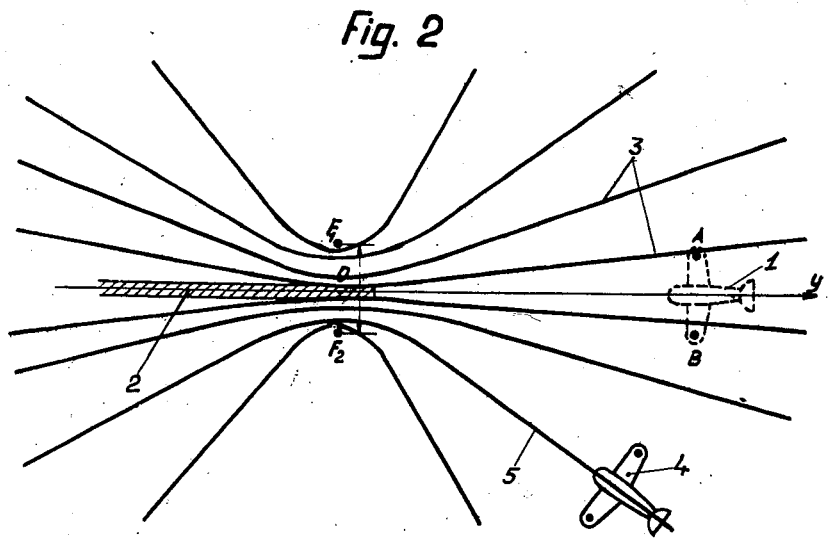
Figure 3:
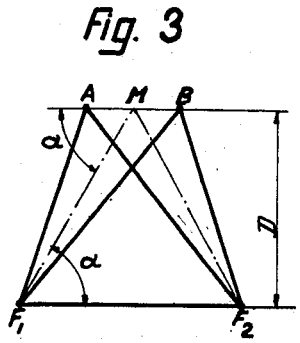
Figure 4:
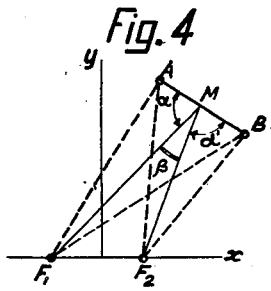
Figure 5:
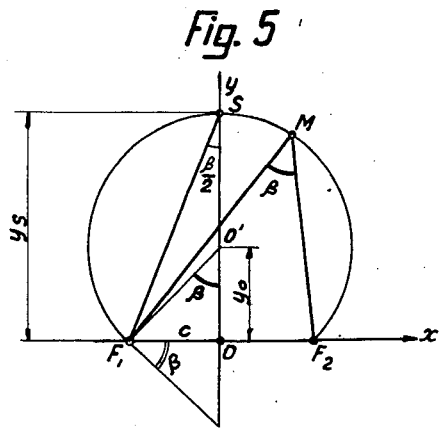
Figure 7:
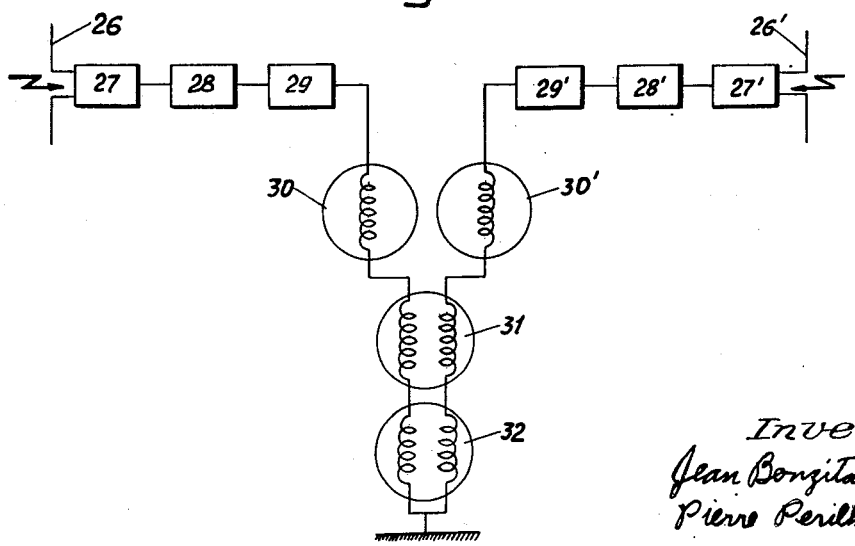

On the drawings, Fig. 1 shows a diagram representing a law of frequency modulation of radiations which may be used in accordance with the invention, Fig. 2 shows a schematic diagram of an application of the invention to the blind landing of aircrafts, Figures 3, 4 and 5 are diagrams given for the purpose of illustration of the mathematical theory of the invention, Figure 6 is a diagram representing a network of guiding curves produced by the system according to the invention, Figure 7 shows an example of embodiment of the receiving equipment according to the invention intended to be carried by a dirigible craft to be guided according to the method of the invention.

As it has been already pointed out in the preamble of the present description, the method and the system of navigation according to the invention are based on the reception by two spaced and independent aerials forming a reception base line adapted to be carried by a dirigible craft of electro-magnetic radiations presenting a parameter or a characteristic variable with time and produced by two transmitting aerials operating in synchronism and forming a transmission base line and on a simultaneous measure of a sum and a difference between differences of variations of said variable parameter or characteristic as shown by said radiations when they are received by the two aerials of said base of reception.

The invention will be described hereinbelow with reference to one of its particularly interesting embodiments applied to the blind landing of aircrafts and comprising the use of frequency modulated radiations. In this case, as it is indicated on Fig. 2 and according to one of the features of the invention, the two transmitting aerials $F_1$ and $F_2$ are arranged on either side of a landing runway 2 and are fed in synchronism by ultra-short wave radiations modulated in frequency. The modulation of frequency of transmitted radiations will be preferably effected according to a saw tooth law as shown in Fig. 1. Each point of the space surrounding said two transmitting aerials $F_1$ and $F_2$ is defined by radiations incoming from said two aerials and is characterized by different frequencies according to the relative position and distance of said point to said two aerials. The lines of points characterized by constant frequency differences are curves constituted by points having fixed differences in range to the two transmitting aerials and form spherical hyperbolas which may be represented by plane hyperbolas such as 3 and 5, as shown in Fig. 2 and having for foci the two transmitting aerials $F_1$ and $F_2$.

The receiving base line is constituted according to the invention by two independent receiving aerials A and B disposed transversally to the craft and in this particular application at the opposite extremities of the wings of an aircraft such as 1 as indicated in Fig. 2. Each of said receiving aerials A and B picks-up radiations produced by two transmitting aerials $F_1$ and $F_2$, the radiations arriving from each of said aerials being characterized by a predetermined frequency depending on the distance between each transmitting aerial and the given receiving aerial. It results that each of the aerials A and B receives two different frequencies giving place after detection to a beat frequency equal to the difference between said received frequencies and proportional to the difference in range of said aerial to the two transmitting aerials. This beat frequency defines thus a curve of equal or constant frequency difference characterizing the point at which is located a receiving aerial at a given time. The basic step of the method according to the invention which consists in simultaneously measuring a sum of and a difference between differences of variations of the variable parameter of radiations transmitted by the two aerials of a transmission base line and received by two receiving aerials, is performed according to the invention by effecting a summation and a subtraction of beat frequencies corresponding to the two receiving aerials A and B.

The principle of the above method will appear more clearly by effecting the computation of a sum and a difference of beat frequencies received by two aerials such as A and B and which represent, allowing for a constant factor or coefficient, the sum and the difference of differences in paths between the respective transmitting aerials $F_1$ and $F_2$ and each of the receiving aerials A and B.

Referring now to Figs. 3 and 4 there are shown transmitting aerials $F_1$ and $F_2$ symmetrically disposed on either side of an assumed axis of a landing runway and receiving aerials A and B indicated as being placed in one case symmetrically on either side of the same axis and in the other case on one side of said axis. By designating by $2a$ and $2b$ the differences in paths between respective transmitting aerials $F_1$ and $F_2$ and each receiving aerial A and B and considering that distance $d$ between said receiving aerials A and B is small in comparison with the distance separating the receiving base line A—B from the transmitting base line $F_1$—$F_2$, one can write with reference to Fig. 4:

$$|AF'-AF|=2\lambda a \quad (1)$$
$$|BF'-BF|=2\lambda b \quad (2)$$

Hence:

$$2|\lambda a+\lambda b|=|AF'-AF|+|BF'-BF| \quad (3)$$

and $$2|\lambda a-\lambda b|=|AF'-AF|-|BF'-BF| \quad (4)$$

Before proceeding with this computation, it is necessary to make an hypothesis on the signs of these differences which are indicated in absolute values.

1. If two aerials A and B are located on the same side of axis OY of a landing runway, as shown in Fig. 4, then said differences are of the same sign. In fact, AF' and BF' being smaller than AF and BF, these differences have negative signs and one can write:

$$2|\lambda a+\lambda b|_1=|(AF'\ BF')-(AF\ BF)| \quad (5)$$
$$2|\lambda a-\lambda b|_1=|(AF'-BF')-(AF-BF)| \quad (6)$$

2. If the two aerials A and B located on either side of axis OY of a landing runway, as shown in Fig. 3, then said differences are of opposite signs. In fact, in such a case, AF' will be greater than AF, but BF' will be smaller than BF. Therefore, the first difference in Equations 3 and 4 will be positive and the second negative and one could write:

$$2|\lambda a+\lambda b|_2=|(AF'-BF')-(AF-BF)| \quad (7)$$
$$2|\lambda a-\lambda b|_2=|(AF'-BF')+(AF\ BF)| \quad (8)$$

Thus: $|\lambda a+\lambda b|_1$ and $|\lambda a-\lambda b|_2$ on one hand, and $|\lambda a-\lambda b|_1$ and $|\lambda a+\lambda b|_2$ on the other hand, are given the same expressions.

If one indicates by M the mid point of distance AB situated on the axis of the craft and one considers that distance $d=AB$ is small in comparison with distances MF and MF', one can write by using the same notations as previously, on one hand:

$$2|\lambda a+\lambda b|_1=2|\lambda a-\lambda b|_2=2|MF'-MF|$$

Hence:

$$|\lambda a+\lambda b|_1=|\lambda a-\lambda b|_2=|MF'-MF|$$

and, on the other hand, $$2|\lambda a-\lambda b|_1=2|\lambda a+\lambda b|_2=|d.\cos\alpha'+d.\cos\alpha|$$

Hence:

$$|\lambda a-\lambda b|_1=|\lambda a+\lambda b|_2=\frac{d}{2}(\cos\alpha'+\cos\alpha)=d\left(\cos\frac{\alpha+\alpha'}{2}\cdot\cos\frac{\alpha-\alpha'}{2}\right)$$

If one imposes in the first case $|\alpha a+\lambda b|_1=C^{te}$ and in the second case $|\lambda a-\lambda b|_2=C^{te}$, the aircraft will follow a hyperbolic curve having for foci $F_1$ and $F_2$ and defined by $|MF-MF'|=C^{te}$. In this manner in the absence of drift, the span of the craft will be normal to a hyperbolic curve of foci $F_1$ and $F_2$ passing through point M or what is the same, will be tangent to the oblic curve of foci $F_1$ and $F_2$ passing through point M. Then, $\alpha=\alpha'$ and this orientation of the craft corresponds evidently to the maximum value of the expression $|\cos\alpha'+\cos\alpha|$ as when the craft turns on the spot, the expression $$\alpha+\alpha'=(\widehat{F'MF})=\pi-\beta$$

remains constant (Fig. 4).

Under these conditions:

$$|\lambda a-\lambda b|_1=|\lambda a+\lambda b|_2=d|\cos\alpha|=d|\sin\beta/2|$$

and even if there is present a certain drift, which causes a difference between angles $\alpha$ and $\alpha'$, one can use this latter expression without committing a substantial error, the expression $|\cos\alpha+\cos\alpha'|$ varying but slightly in the vicinity of its maximum.

If it is desired to find the locus of points M for which the maximum of expression $|\lambda a-\lambda b|_1$ in the first case, or the maximum of expression $|\lambda a+\lambda b|_2$ in the second case, is constant, it appears that said locus is defined by expression $$\sin\beta/2=\pm K$$

where K is a constant. This locus of points is thus formed by two equal arcs of circles passing through points $F_1$ and $F_2$ and limited at said points.

It appears immediately that the two arcs completing said circles correspond to an angle complementary to the first, i. e. to:

$$\sin\beta/2=\pm\sqrt{1-K^2}$$

By referring to Fig. 5, it is easy to compute the elements defining these arcs of circle: one finds (c being a half distance between points $F_1$ and $F_2$):

Ordinates of the centers:

$$Y_o=\pm c.\cotg\beta=\pm c.\frac{1-2K^2}{2K\sqrt{1-K^2}}$$

Common radius:

$$R=\frac{c}{\sin\beta/2}=\frac{c}{2K\sqrt{1-K^2}}$$

Ordinates of tops:

$$Y_s=\pm c.\cotg\beta/2=\pm c.\frac{\sqrt{1-K^2}}{K}$$

A simultaneous knowledge of expressions $|\lambda a+\lambda b|$ and $|\lambda a-\lambda b|$ permits thus in any case to locate a craft at the intersection of an hyperbolic line of foci $F_1$ and $F_2$ and of a circle passing by said points $F_1$ and $F_2$. It is only necessary to be cautious about a change in the parts played by expressions $|\lambda a+\lambda b|$ and $|\lambda a-\lambda b|$, when one of receiving aerials A and B crosses axis OY of the landing runway.

The locus of points M for which this condition is fulfilled is defined, considering distance $d$ as small in comparison with distance MF and MF', by condition:

$$MF'-MF=d.\sin\frac{\widehat{F'MF}}{2}$$

It is apparent that said locus of points M may be assimiliated to two straight lines parallel to axis OY and situated at a distance $d$ from said axis on either side thereof, defining thus along said axis a channel of rectilineal guidance as shown in Fig. 6. Accordingly, the curves defined by expression $|\lambda a+\lambda b|=C^{te}$ comprise in the region outside of said channel region a set of hyperbolic lines 21 having for foci points $F_1$ and $F_2$ and which are completed, inside said channel region, by small arcs of circles 22 passing through points $F_1$ and $F_2$. On the contrary, the curves defined by expression $|\lambda a-\lambda b|=C^{te}$ comprise in the outside region, a set of circles 23 passing through points $F_1$ and $F_2$, said circles being completed in the central region by arcs of hyperbolae 24 of foci $F_1$ and $F_2$ as indicated in Fig. 6.

The great density of said arcs of hyperbolae in the said channel region of width $d$ is indicative of a high precision of indications that can be obtained in the outside region by the knowledge of expression $|\lambda a-\lambda b|_2$ as regards the distance of the craft to axis OY of a landing runway. On the other hand, the knowledge in said channel region of $|\lambda a+\lambda b|=Kd$ defines the distance of the craft to the base line $F_1 F_2$ according to the principle disclose in a co-pending patent application filed on September 22, 1948, under Serial No. 50,515 and entitled Improvements in Distance Measuring Systems.

To recapitulate now a blind landing manoeuvre, the same is effected as follows:

By referring to a beat frequency received by one of its aerials or to a sum of beat frequencies received by its two aerials, an aircraft flies toward a landing runway maintaining a certain altitude and knowing its distance thereto given by a measure of the difference of beat frequencies received by the two aerials. The indications of each aerial may be used also for determining the direction in which the craft must turn to move toward the direction of a landing runway. Once the craft is on said direction OY, the precision of its directional guidance may be increased by referring on one hand to the measure of the difference of said frequencies received by the two aerials which must be rendered as small as possible and theoretically equal to zero in order to cause the craft to follow the direction of landing defined by the axis OY, and on the other hand, to the measure of the sum of said frequencies which permits to know at every moment the distance of the craft to the transmission base line $F_1-F_2$ and the intersection of which with the axis OY might define a desired point of landing.

In a practical embodiment of the invention, as described above, the transmission system may have the following characteristics:

There will be used a transmitting tube constituted by a grounded grid circularly sealed triode capable to deliver a power of the order of one kilowatt, on a 50 centimeter wave length. It will be mounted in a coaxial circuit particularly simple and effective for such a tube and the considered wave length. Variation of frequency will be obtained by a mechanically controlled piston plunger. Said frequency variation will be for instance of 40 cycles with a period of 0.01 second. Two loops will permit to pick up high frequency energy which will be transmitted by means of two coaxial lines of the same length, to two dipoles arranged on either side of the landing runway at a distance of approximately 100 meters in front of the desired touch down point. It is also possible to use directive aerials of reduced concentration. In such a case the aerials must be located on either side of the landing runway but at the other extremity of the same. High frequency power will be conducted to said transmitting aerials by coaxial cables or by wave guides. The aerials may be constituted by horns and more particularly with a wave guide cut off following a vertical straight section.

Each transmitting aerial being able to transmit several hundred watts at a well defined frequency, the receiver may be formed simply by a single tuned circuit suitably damped with a crystal detector followed by a reduced number of low frequency amplification stages. This results in a great economy in weight and space and an increased safety.

Fig. 7 of the drawings shows by way of example a block diagram of such a receiver equipment which may be used in a system such as described above and carried by a mobile craft such as aircraft. The two receiving aerials equivalent to aerials A and B previously described are designated by reference numerals 26—26'. Each of said aerials is followed by a detector 27—27', an amplifier 28—28' and a discriminator 29—29', the outputs of said discriminator being connected to a measuring apparatus which may comprise two separate galvanometric instruments of a single coil type 30—30' intended to give a measure of beat frequencies received by the respective aerials as well as two measuring instruments 31 and 32 of a double coil type measuring respectively the sum of and the difference between said beat frequencies received by the two aerials.

In practice the two indicating instruments of the two coil type must be associated with two further indicating devices adapted to be connected alternatively to said instruments depending on the weather the craft is in the central region of rectilineal guiding or in the region outside of this first region. In fact, this is necessary for the reason of a change in the nature of indications given by a sum and a difference of beat frequencies received by the two aerials depending on whether the craft is in one or in the other of said regions.

It is understood that the invention is not limited to the specific embodiments described and illustrated but may be embodied in various different manners and that various changes and modifications evident to men skilled in the art may be made therein without departing from the spirit of the invention. Thus, the frequency of radiations transmitted by one of the transmitting aerials may be made smaller by a fixed amount, than the frequency transmitted by the other aerial. In such a case, the locus of points, having constant differences in range to two transmitting aerials, is characterized by a constant difference in frequencies received at every instant from two transmitting aerials. This modification gives the possibility to know if an aircraft deviates, by a small amount, from a privileged axis of guiding depending on whether the frequency difference received is smaller or greater than said predetermined fixed frequency difference. This frequency difference may be obtained in various manners, for instance, by feeding the transmitting aerials from a single source of energy by feeders of different lengths, or by using a single frequency modulated oscillator connected to one aerial directly, and to the other aerial by the intermediary of a system producing a beating with a fixed frequency, and in which the resulting frequency is separated by filtering.

We claim:

1. A method of radio-navigation which consists in transmitting from two transmitting aerials forming a transmission base line electro-magnetic radiations defining in space curves or lines of positions characterized by constant values of a certain parameter of said radiations, receiving said radiations on two receiving aerials forming a receiving base line provided on a craft and combining the radiations received on each of said latter aerials from both said transmitting aerials so as to detect on the craft equi-signal characteristic curves or lines of positions of two different geometrical natures permitting respectively on one hand providing indications of directional guidance of the craft toward said transmission base line along characteristic curves of one geometrical nature and on the other hand providing indications of distance of the craft to said base line along said characteristic curves.

2. A method of radio-navigation which consists in transmitting from two transmitting aerials forming a transmission base line electromagnetic radiations defining in space curves or lines of positions characterized by constant values of a certain parameter of said radiations, receiving said radiations on two receiving aerials forming a receiving base line provided on a craft and combining the radiations received by each of said latter aerials from both said transmitting aerials so as to detect on the craft equi-signal characteristic curves or lines of positions of two different geometrical natures, the intersections of which define fixes of various points of space with respect to said transmission base line.

3. A method of radio-navigation which consists in transmitting from two transmitting aerials forming a transmission base line electromagnetic radiations defining in space curves or lines of positions characterized by constant values of a certain variable parameter of said radiations, receiving said radiations on two receiving aerials forming a receiving base line provided on a craft and combining the radiations received by each of said latter aerials from both said transmitting aerials so as to detect on the craft two distinct networks of equi-signal characteristic curves or lines of positions of two different geometrical natures defining a rectilinear channel of guidance toward said transmission base line and permitting the craft on one hand whilst outside of said channel to be directed toward said channel or said transmission base line, while knowing at every instant its position with respect to said channel as well as with respect to said transmission base line and on the other hand whilst on said channel to be guided along said channel, while knowing at every instant its lateral deviation from said direction and its distance to the transmission base line.

4. A method of radio-navigation for dirigible crafts comprising transmitting from two transmitting aerials forming a transmission base line and operating in synchronism electromagnetic radiations presenting a variable characteristic or parameter in relation to time and defining in space lines of points the differences of distances of which to said two transmitting aerials are constant and which are therefore hyperbolae having for foci the points of location of said transmitting aerials, receiving said radiations on two spaced and independent aerials forming a receiving base line on the craft, using said received radiations to provide measures of the sum and the difference of differences of variations of said variable characteristic of said radiations as the same are received by each of said receiving aerials from said two transmitting aerials and deriving from said measures indications of position of the craft.

5. A method of radio-navigation for dirigible crafts comprising transmitting from two transmitting aerials electro-magnetic radiations defining in space curves or lines of positions characterized by constant values of a certain parameter of said radiations, receiving said radiations on two receiving aerials forming a receiving base line provided on a craft and using said received radiations so as to detect on the craft equi-signal characteristic curves or lines of positions of two different geometrical natures defining around said transmission base line two regions, one of which extends along the perpendicular bisector of the transmitting base line and has a width corresponding to the spacing of the two receiving aerials carried by the craft, and the other located outside of said first region and extending all around said transmitting aerials, the first of said regions defining a channel of rectilinear guiding of a craft and the second of said regions defining azimuthal guiding of a craft along any direction toward or away from said first region and said transmission base line.

6. A method of radio-navigation for dirigible crafts comprising transmitting from two transmitting aerials forming a transmission base line and operating in synchronism electromagnetic radiations presenting a variable characteristic or parameter in relation to time and defining in space lines of points the differences of distances of which to said two transmitting aerials are constant and which are therefore hyperbolae having for foci the points of location of said transmitting aerials, receiving said radiations on two spaced and independent aerials forming a receiving base line on the craft, using said received radiations to provide measures of the sum and the difference of differences of variations of said variable characteristic of said radiations as the same are received by each of said receiving aerials from both said transmitting aerials and deriving from said measures indications of guidance of the craft defining in space around said transmission base line two regions one of which extends along the perpendicular bisector of the transmitting base line and has a width corresponding to the spacing of the two receiving aerials carried by the craft, and the other located outside of said first region and extending all around said transmitting aerials, the first of said regions defining a channel of rectilinear guiding of the craft toward or away from said transmission base and the second of said regions defining azimuthal guiding of the craft along any direction toward or away from said first region or said transmission base line.

7. A method of radio navigation according to claim 6 in which the outside region of guidance is characterized by hyperbolic lines of positions defined by constant sums of differences of variations of the variable parameter of guiding radiations produced by two transmitting aerials and received by two receiving aerials on one hand, and by the arcs of circles passing through said transmitters and having their centers on the axis of the first region on the other hand, said arcs of circles being defined by constant differences of differences of variations of the variable parameter of radiations produced by two transmitting aerials and received by two aerials of the receiving base line.

8. A method of radio navigation according to claim 6 in which the central region of rectilineal guiding is characterized by the arcs of circles defined by constant sums of differences of variations of said variable parameter of radiations as received by the two receiving aerials on one hand, and by arcs of hyperbolae defined by constant difference of the same differences of variations of the variable parameter of radiations as received by the two receiving aerials.

9. A method of radio navigation according to claim 6 in which the measure of a sum of differences of variations of the variable parameter of radiations upon their arrival on the two receiving aerials, in the central region of guidance and of a difference of differences of variations of the variable parameter of radiations received by the two receiving aerials in the outside region serve to indicate the distance of the craft to the point of origin constituted by the mid-point of the transmitting base line.

10. A method of radio navigation according to claim 6 in which the measure of a difference of differences of variations of the variable parameter of radiations at their arrival on the two receiving aerials, in the central region of rectilineal guidance serves as an indication for guiding the craft following the axis of said region, whilst the measure of the sum of differences of variations of the variable parameter of transmitted radiation received by the two receiving aerials in the outside region serve as an indication for guiding the craft toward the transmission base line along hyperbolic lines defined by constant values of said sums of differences of variations of the variable parameter of the radiations.

11. A system for radio navigation or guiding of a dirigible craft comprising means for transmitting from two points of a transmission base line radiations of wave energy presenting a variable parameter and defining in space curves or lines of positions having constant differences in range to said two transmitting points and characterized by constant differences of said parameter, means for receiving said radiations at two points of a receiving base line carried by the craft and means for combining radiations received at said latter two points for producing indications of direction of guidance of the craft with respect 12. A system for radio navigation or guiding of a dirigible craft comprising means for transmitting from two points of a transmission base line radiations of wave energy presenting a variable parameter in relation to time and defining in space curves or lines of positions having constant differences in range to said two transmitting points and characterized by constant differences of said parameter, means for receiving said radiations at two points of a receiving base line carried by the craft and means for combining radiations received at said latter two points for producing indications of direction of guidance of the craft with respect to said transmission base line and of its distance to said base line.

13. A system for radio navigation or guiding of a dirigible craft comprising means for transmitting from two points of a transmission base line radiations of wave energy presenting a variable parameter in relation to time and defining in space curves or lines of positions having constant differences in range to said two transmitting points and characterized by constant differences of said parameter, means for receiving said radiations at two points of a receiving base line carried by the craft and means for combining radiations received at said latter two points for detecting on the craft characteristic curves or lines of positions of different geometrical natures permitting respectively to guide a craft toward said transmission base line and to determine at any time the distance of the crafts to said line.

14. A system for radio navigation or guiding of a dirigible craft comprising means for transmitting from two points of a transmission base line radiations of wave energy presenting a variable parameter in relation to time and defining in space curves or lines of positions having constant differences in range to said two transmitting points and characterized by constant differences of said parameter, means for receiving said radiations at two points of a receiving base line carried by the craft and means for combining radiations received at said latter two points for detecting on the craft characteristic curves or lines of positions of different geometrical natures, the intersections of which define fixes of various points of space with respect to said transmission base lines.

15. A system for a radio navigation or guiding of a dirigible craft comprising means for transmitting from two points of a transmission base line radiations of wave energy presenting a variable parameter in relation to time and defining in space curves or lines of positions having constant differences in range to said two transmitting points and characterized by constant differences of said parameter, means for receiving said radiations at two points of a receiving base line carried by the craft and means for combining radiations received at said latter two points for detecting on the craft characteristic curves or lines of positions of different geometrical natures permitting respectively to guide a craft tward said transmission base line and to determine at any time the distance of the craft to said line and which define by their intersections fixes of various points of space with respect to said transmission base line.

16. A system for radio navigation or guiding of a dirigible craft comprising means for transmitting from two points of a transmission base line radiations of wave energy presenting a variable parameter in relation to time and defining in space curves or lines of positions having constant differences in range to said two transmitting points and characterized by constant differences of said parameter, means for receiving said radiations at two points of a receiving base line carried by the craft and means for combining radiations received at said latter two points for detecting on the craft characteristic curves or lines of positions of different geometrical natures defining a region of a privileged rectilinear guidance following a channel of a predetermined width and a region of azimuthal guidance following any direction toward or away from said first region and which permits in each of said regions to provide an indication of distance of the craft to said transmitting base line.

17. A system for radio navigation or guiding of a dirigible craft comprising means for transmitting from two points of a transmission base line radiations of wave energy presenting a variable parameter in relation to time and defining in space curves or lines of positions having constant differences in range to said two transmitting points and characterized by constant differences of said parameter, means comprising two spaced and independent aerials for receiving said radiations on the craft, means for using radiations received by said latter two aerials for providing measures of the sum and the difference of differences of variations of said variable parameter of said radiations as received by each of said two aerials from both said transmitting aerials and means for deriving from said measures indications of guidance of the craft with respect to said transmission base line.

18. A system of radio-navigation comprising two transmitting aerials defining a transmission base line, means for operating said aerials to transmit synchronously related frequency modulated radiations defining in space a family of hyperbolic lines of positions presenting constant differences in range to said transmitting aerials and characterized by corresponding frequency differences, means comprising two spaced and independent aerials for receiving said radiations on the craft, means for detecting beat frequencies corresponding to said frequency differences at each aerial and means for measuring sums and differences of such beat frequencies collected by said two receiving aerials to provide indications of directional guidance of the craft toward, and of its position with respect to, said transmission base line.

19. A system of radio-navigation comprising two transmitting aerials defining a transmission base line, means for operating said aerials to transmit synchronously related frequency modulated radiations defining in space a family of hyperbolic lines of positions presenting constant differences in range to said transmitting aerials and characterized by corresponding frequency differences, means comprising two spaced and independent aerials for receiving said radiations on the craft, means for detecting beat frequencies corresponding to said frequency differences at each aerial and means for measuring separately and simultaneously a sum and a difference of such beat frequencies collected by said two receiving aerials to provide indications of directional guidance of the craft toward, and of its position with respect to said transmission base line.

20. A system of radio-navigation comprising two transmitting aerials defining a transmission base line, means for operating said aerials to transmit synchronously related frequency modulated radiations defining in space a family of hyperbolic lines of positions presenting constant differences in range to said transmitting aerials and characterized by corresponding frequency differences, means comprising two spaced and independent aerials for receiving said radiations on the craft, means for detecting beat frequencies corresponding to said frequency differences at each aerial and means for measuring sums and differences of such beat frequencies collected by said two receiving aerials, said measures of sums and differences of beat frequencies defining in space two regions, characterized by two distinct networks of curves of constant values of said sums and differences of beat frequencies providing indications of direction of guidance of the craft with respect to said transmission base line and of its position with respect to said base line, one of said regions extending along the perpendicular bisector of the transmitting base line and having width corresponding to the spacing of the two receiving aerials carried by the craft, and the other being located outside of said first region and extending all around said transmitting aerials, the first of said regions defining a channel of rectilinear guiding of the craft along said bi-sector line and the second of said regions defining azimuthal guiding of the craft along any direction toward or away from said first region and said base line.

21. A system according to claim 20 in which the privileged direction or channel of guidance is characterized on one hand by curves of equal beat frequency differences represented by arcs of hyperbolae having for foci the points of location of transmitting aerials and on the other hand by curves of equal sums of beat frequencies represented by arcs of circles passing through the same points of location of said transmitting aerials and having their centers on the axis of said channel, the measure of a beat frequency difference equal to zero defining the axis of said channel and the measures of sums of said beat frequencies defining distances of the craft to the transmission base line along said axis.

22. A system according to claim 20 in which the region outside of said privileged direction or channel of guidance is characterized on one hand, by curves of equal beat frequency differences represented by circles passing through the points of location of said transmitting aerials and having their centers on the axis of said privileged direction or channel of guidance and on the other hand, by curves of equal sums of beat frequencies represented by hyperbolae having for their foci the same points of location of said transmitting aerials, the measure of a beat frequency difference defining the distance of the craft to the transmission base line and the measure of a sum of beat frequencies designing one of said hyperbolic lines of position along which the craft may be guided toward said transmission base line.

23. A system of radio-navigation comprising two transmitting aerials defining a transmission base line, means for operating said aerials to transmit synchronously related frequency modulated radiations defining in space a family hyperbolic lines of positions presenting constant differences in range to said transmitting aerials and characterized by corresponding frequency differences, means comprising two spaced and independent aerials provided on the craft for receiving said radiations, means for detecting beat frequencies corresponding to said frequency differences at each aerial and means for measuring simultaneously sums and differences of beat frequencies collected by said two receiving aerials to determine positions of the craft with respect to said transmission base line.

24. A system of radio-navigation comprising two transmitting aerials defining a transmission base line, means for operating said aerials to transmit synchronously related frequency modulated radiations defining in space a family of hyperbolic lines of positions presenting constant differences in range to said transmitting aerials and characterized by corresponding frequency differences, means comprising two spaced and independent aerials provided on the craft for receiving said radiations, means for detecting beat frequencies corresponding to said frequency differences at each aerial and means for measuring simultaneously sums and differences of such beat frequencies collected by said two receiving aerials to determine positions of the craft with respect to said transmission base line, each of said positions being determined by an intersection of a curve of equal beat frequency difference represented by a circle passing through the points of location of said transmitting aerials and having its center on the bisector perpendicular of said transmission base line and a curve of equal sum of beat frequencies represented by a hyperbola having for its foci the points of location of said transmitting aerials.

25. A system of radio-navigation according to claim 24 in which guiding radiations are transmitted from two aerials of the transmission line with a predetermined and fixed difference in frequency, whereby the line of points having a same range to the two transmitting aerials is characterized by a predetermined fixed frequency difference and may serve for guiding a craft along said line.

26. A blind landing system for aircrafts, comprising a transmission base line disposed perpendicularly to the axis of a runway with a transmitting aerial on either side of said axis, said aerials being adapted to transmit in synchronism, radiations of wave energy presenting a variable parameter and defining in space equi-signal characteristic curves or lines of position presenting constant differences in range to said aerials and characterized by constant differences of said parameter, means for receiving said radiations on a dirigible craft comprising two spaced and independent receiving aerials, means for detecting said differences of the variable parameter of said radiations as the same are received by said two aerials and means for measuring separately and simultaneously sums and differences of said parameter differences to provide indications of guidance of the craft along the bisector perpendicular of said transmission base line defining the direction of landing, indications of distance of the craft, along said bisector perpendicular, to a desired point of landing, indications of distance of the craft to the mid point of said base line along any direction and indications of position of the craft with respect to said axis of landing and to said desired point of landing.

27. A system of guiding a vessel toward and along the entrance of a harbor comprising a transmission base line disposed perpendicularly to the axis of said entrance of a harbor with a transmitting aerial on either side of said axis, said aerials being adapted to transmit in synchronism radiations of wave energy presenting a variable parameter and defining in space equisignal characteristic curves or lines of position presenting constant differences in range to said transmitting aerials and characterized by constant differences of said parameter and means for receiving said radiations on the vessel comprising two spaced and independent aerials, means for detecting said differences of parameter of said radiations as the same are received by said two aerials and means for measuring separately and simultaneously sums and differences of said parameter differences to provide indications permitting to define the axis of said entrance of a harbor, the distance of the vessel along said axis to a desired point on said axis, the distance of the vessel to the mid point of said transmission base line and the position of the vessel with respect to said axis and to said point.

JEAN BOUZITAT.
PIERRE PERILHOU.

REFERENCES CITED

The following references are of record in the file of this patent:

UNITED STATES PATENTS

| Number | Name | Date |
|---|---|---|
| 2,403,626 | Wolff et al. | July 9, 1946 |
| 2,408,773 | Goodall | Oct. 8, 1946 |
| 2,413,694 | Dingley | Jan. 7, 1947 |
| 2,451,823 | Guanella | Oct. 19, 1948 |
| 2,479,567 | Hallman | Aug. 23, 1949 |